(12) United States Patent
Mater et al.

(10) Patent No.: US 8,493,864 B1
(45) Date of Patent: *Jul. 23, 2013

(54) CABLE FAR END PORT IDENTIFICATION USING REPEATING LINK STATE PATTERNS

(75) Inventors: Olaf Mater, Eggenstein-Leopoldshafen (DE); Joachim Schmalz, Bischweier (DE)

(73) Assignee: Marvell International Ltd., Hamilton (BM)

( * ) Notice: Subject to any disclaimer, the term of this patent is extended or adjusted under 35 U.S.C. 154(b) by 126 days.

This patent is subject to a terminal disclaimer.

(21) Appl. No.: 13/099,036

(22) Filed: May 2, 2011

Related U.S. Application Data

(63) Continuation of application No. 12/260,527, filed on Oct. 29, 2008, now Pat. No. 7,936,671.

(60) Provisional application No. 60/987,225, filed on Nov. 12, 2007.

(51) Int. Cl.
*H04L 12/24* (2006.01)
*H04L 12/26* (2006.01)
*H04B 10/08* (2006.01)

(52) U.S. Cl.
USPC ........... 370/235; 370/242; 370/252; 370/419; 398/9

(58) Field of Classification Search
USPC ................ 370/229–240, 241–254, 419–421, 370/463; 389/9–36; 398/9–36
See application file for complete search history.

(56) References Cited

U.S. PATENT DOCUMENTS

| | | | | |
|---|---|---|---|---|
| 5,226,120 A * | 7/1993 | Brown et al. | ................. | 709/224 |
| 6,434,716 B1 * | 8/2002 | Johnson et al. | ................ | 714/712 |
| 6,483,849 B1 * | 11/2002 | Bray et al. | ..................... | 370/465 |
| 6,657,548 B2 * | 12/2003 | Dai | .......................... | 340/815.45 |
| 6,810,439 B2 * | 10/2004 | Benson | ......................... | 710/16 |
| 7,312,719 B2 * | 12/2007 | Hsieh | ....................... | 340/815.45 |
| 7,421,625 B2 * | 9/2008 | Bhesania et al. | ................ | 714/57 |
| 7,506,219 B2 * | 3/2009 | Bhesania et al. | ................ | 714/57 |
| 7,885,192 B1 * | 2/2011 | Lo | ................................. | 370/235 |
| 2008/0104275 A1 * | 5/2008 | Almeida et al. | .............. | 709/243 |

\* cited by examiner

*Primary Examiner* — Tri H Phan

(57) ABSTRACT

An apparatus including: a first port configured to receive a first end of a cable to provide a communication link between (i) the first port, and (ii) a second port coupled to a second end of the cable. The apparatus further includes a processor configured to, during a time that the first end of the cable is coupled to the first port and the second end of the cable is coupled to the second port, (i) receive a command to identify the second port to which the second end of the cable is coupled, and (ii) in response to the command, repeatedly change the state of the communication link at the first port in accordance with a pattern.

15 Claims, 4 Drawing Sheets

CABLE FAR END PORT IDENTIFICATION USING REPEATING LINK STATE PATTERNS

CROSS-REFERENCE TO RELATED APPLICATIONS

This application is a continuation of U.S. application Ser. No. 12/260,527 (now U.S. Pat. No. 7,936,671), filed on Oct. 29, 2008, which claims the benefit of U.S. Provisional Application No. 60/987,225, filed on Nov. 12, 2007.

BACKGROUND

The present disclosure relates generally to data communications over cable. More particularly, the present disclosure relates to identifying the port connected to the far end of a cable using a device connected to the near end of the cable.

In a typical office, devices such as personal computers, printers, and the like are connected to a corporate network by cables such as Ethernet cables. Each cable is generally connected to one or more switches, which are located away from the devices, for example in a separate room. Each switch has many ports, each connected to one of the cables. In such a system, one problem commonly encountered by a network administrator is how to visually identify the switch port to which a particular device is connected.

Some network configuration utilities include a function to identify the local network card using a flashing LED. However, this function only helps to identify a specific network port of a local device with several network cards installed. The function is unable to identify a port connected to the far end of a cable connected to the local device.

SUMMARY

In general, in one aspect, an embodiment features a method comprising: receiving a command to identify a connected port at a far end of a cable providing a communication link; and changing a state of the communication link at a near end of the cable according to a repeating pattern in response to the command.

Embodiments of the method can include one or more of the following features. In some embodiments, the state of the communication link includes at least one of: link activity up/down status; link speed; and link half/full duplex status. Some embodiments comprise displaying an indication of the repeating pattern on a monitor at the near end of the cable. In some embodiments, the command indicates the repeating pattern. In some embodiments, the cable is an Ethernet cable. In some embodiments; the cable is selected from the group consisting of: a USB cable; a IEEE 1394 firewire cable; an ISDN cable; an analog telephone cable; a digital telephone cable; and an optical cable.

In general, in one aspect, an embodiment features an apparatus comprising: a first port to connect with a near end of a cable providing a communication link; and a controller to change a state of the communication link at the near end of the cable according to a repeating pattern in response to a command to identify a second port connected with a far end of the cable.

Embodiments of the apparatus can include one or more of the following features. In some embodiments, the state of the communication link includes at least one of: link activity up/down status; link speed; and link half/full duplex status. Some embodiments comprise a monitor at the near end of the cable to display an indication of the repeating pattern. In some embodiments, the command indicates the repeating pattern. In some embodiments, the cable is an Ethernet cable. In some embodiments, the cable is selected from the group consisting of: a USB cable; a IEEE 1394 firewire cable; an ISDN cable; an analog telephone cable; a digital telephone cable; and an optical cable. Some embodiments comprise a network device comprising the apparatus. In some embodiments, the network device is selected from the group consisting of: a network switch; a router; and a network interface controller. Some embodiments comprise a computer comprising the network device.

In general, in one aspect, an embodiment features a computer program comprising: instructions for receiving a command to identify a connected port at a far end of a cable providing a communication link; and instructions for changing a state of the communication link at a near end of the cable according to a repeating pattern in response to the command.

Embodiments of the computer program can include one or more of the following features. In some embodiments, the state of the communication link includes at least one of: link activity status; link speed; and link half/full duplex status. Some embodiments comprise instructions for displaying an indication of the repeating pattern on a monitor at the near end of the cable. In some embodiments, the command indicates the repeating pattern. In some embodiments, the cable is an Ethernet cable. In some embodiments, the cable is selected from the group consisting of: a USB cable; a IEEE 1394 cable; an ISDN cable; an analog telephone cable; a digital telephone cable; and an optical cable.

In general, in one aspect, an embodiment features an apparatus comprising: first port means for connecting with a near end of a cable providing a communication link; and controller means for changing a state of the communication link at the near end of the cable according to a repeating pattern in response to a command to identify a second port connected with a far end of the cable.

Embodiments of the apparatus can include one or more of the following features. In some embodiments, the state of the communication link includes at least one of: link activity status; link speed; and link half/full duplex status. Some embodiments comprise monitor means, at the near end of the cable, for displaying an indication of the repeating pattern. In some embodiments, the command indicates the repeating pattern. In some embodiments, the cable is an Ethernet cable. In some embodiments, the cable is selected from the group consisting of: a USB cable; a IEEE 1394 cable; an ISDN cable; an analog telephone cable; a digital telephone cable; and an optical cable. Some embodiments comprise a network device comprising the apparatus. In some embodiments, the network device is selected from the group consisting of: a network switch; a router; and a network interface controller. Some embodiments comprise a computer comprising the network device.

The details of one or more implementations are set forth in the accompanying drawings and the description below. Other features will be apparent from the description and drawings, and from the claims.

Figure 1:
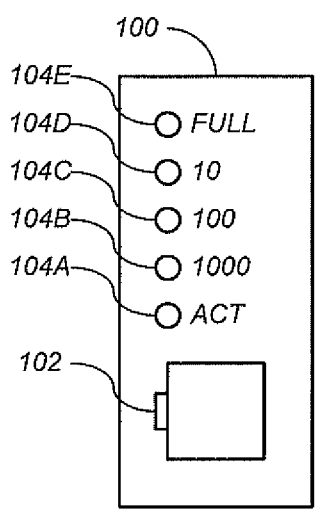
FIG. 1 shows a port for a conventional network device.

The leading digit(s) of each reference numeral used in this specification indicates the number of the drawing in which the reference numeral first appears.

DETAILED DESCRIPTION

The subject matter of the present disclosure relates to identifying the port connected to the far end of a cable using a device having a port connected to the near end of the cable using link state indicators of the far-end port. In a typical network device, one or more link state indicators is provided for each port. For example, each port may have one or more light-emitting diodes (LEDs) to indicate the state of the link associated with the port. In embodiments of the present invention, these indicators are manipulated using repeating patterns so the far-end port can easily be identified. The manipulations of the far-end indicators are done using the default communication protocol between both peers. The far end peer does not need any special hardware or software to be able to show the manipulated pattern.

FIG. 1 shows a port 100 for a conventional network device. Referring to FIG. 1, port 100 includes a connector 102 for connecting a cable to provide a communication link, and LEDs 104A-E. LEDs 104 indicate the link state of the link for port 100. LED 104A indicates the link activity state, that is, whether the link is up or down. LEDs 104B-D indicate the link speed in Mb/s. LED 104E indicates the duplex state of the link, that is, whether the link is full duplex or half duplex.

While a user device such as a computer or printer may have only one port, a switch generally has many. When a network administrator is troubleshooting a link at the switch, it can be difficult to identify the switch port connected to a particular device. To solve this problem, embodiments of the present invention manipulate the link state at the device, which is connected to the "near end" of the cable, so as to produce a repeating pattern in the LEDs at the switch port connected to the "far end" of the cable. The pattern is selected to be significantly different from normal operation patterns, and therefore easily recognizable to humans, so that the network administrator can identify the switch port for the device at a glance.

Figure 2:
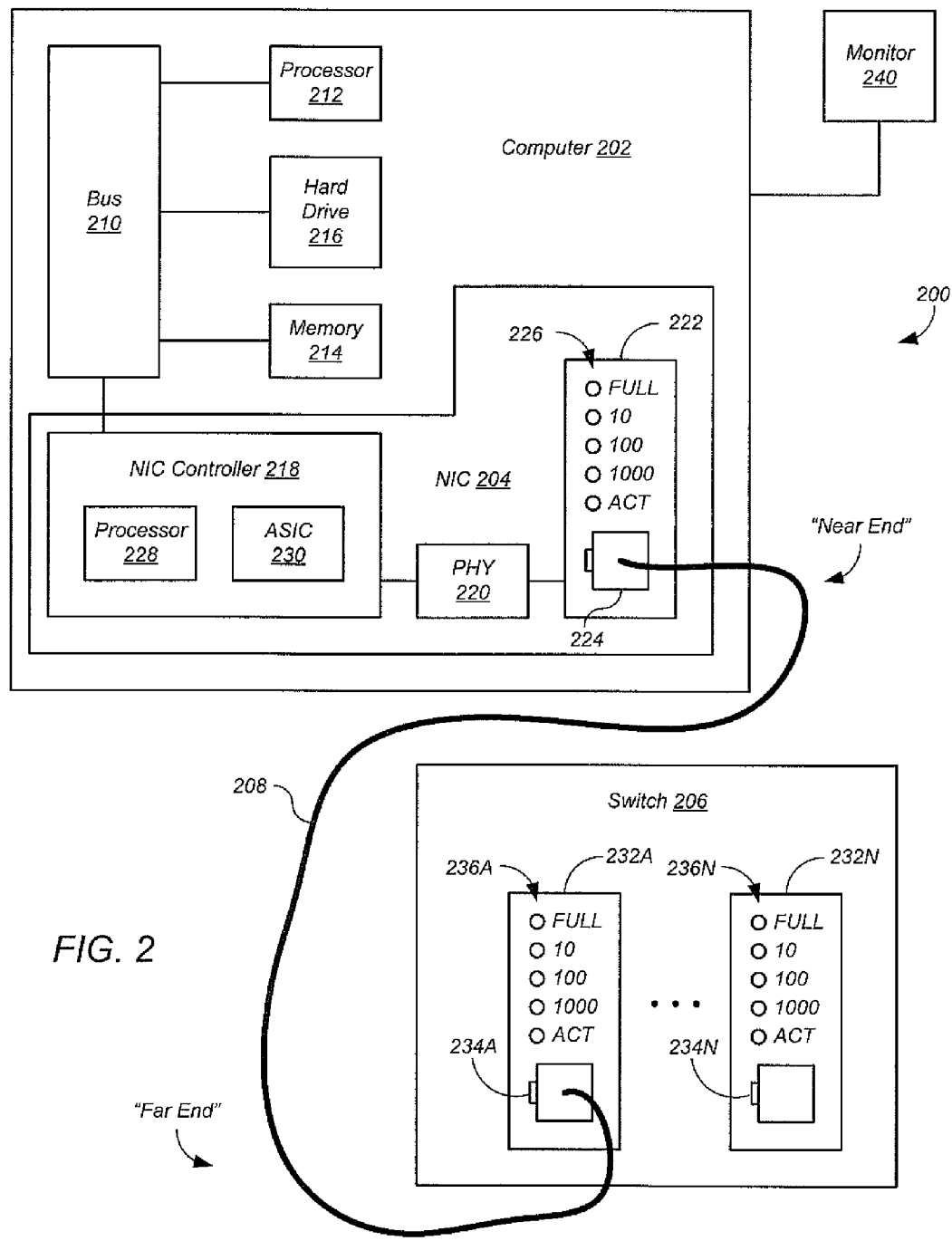
FIG. 2 shows a data communications system according to one embodiment.

FIG. 2 shows a data communications system 200 according to one embodiment. Data communications system 200 includes a computer 202 that includes a network interface controller (NIC) 204 connected to a switch 206 by a network cable 208. While various embodiments are described with respect to computer 202, and NIC 204; they are equally applicable to other sorts of devices such as printers, scanners, routers, switches, and the like. In addition, while various embodiments are described with respect to network communications, they are equally applicable to devices employing other forms of data communications, which can use different signaling protocols, such as direct links and the like. For example, while in the described embodiments cable 208 is an Ethernet cable, in other embodiments, cable 208 can be a USB cable, a IEEE 1394 cable (also known as firewire), and the like. In addition, cable 208 is not limited to electrical cables, and in other embodiments can be an optical cable or the like.

As another example, data communications system 200 can be a telephone system where computer 202 is replaced by a telephone and cable 208 can be an Integrated Services Digital Network (ISDN) cable, an analog telephone cable, a digital telephone cable, or the like. In such embodiments, visual indicators (such as LEDs) can be augmented or replaced by audible indicators such as specific ringtones which are not used during normal operation and the like.

Referring to FIG. 2, computer 202 includes NIC 204, which is connected by a bus 210 to a processor 212, a memory 214, and a hard drive 216. NIC 204 includes a controller 218, a physical-layer device (PHY) 220, and a port 222. Port 222 includes a connector 224 and LEDs 226, which can be arranged as shown for port 100 of FIG. 1. In various embodiments, controller 218 includes a processor 228, an ASIC (application-specific integrated circuits) 230, or both.

Switch 206 includes a plurality of ports 232A-N, each including a respective one of connectors 234A-N and a respective group of LEDs 236A-N. Cable 208 is connected to port 232A of switch 206, as shown in FIG. 2. For clarity, the end of cable 208 connected to computer 202 is referred to as the "near end," while the end of cable 208 connected to switch 206 is referred to as the "far end." LEDs 236A-N at the "far end" may be different in alignment, number, and color from LEDs 226 at the "near end". Data communications system 200 can also include a monitor 240 connected to computer 202.

Figure 3:
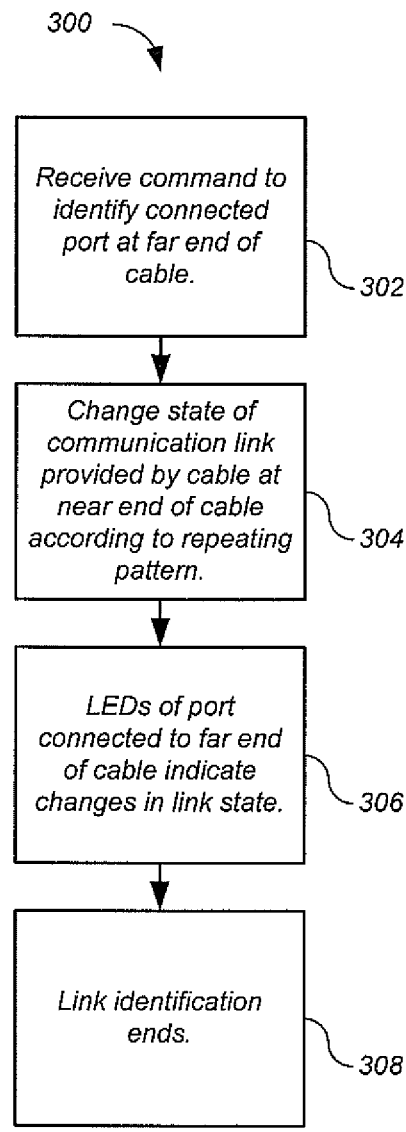
FIG. 3 shows a process for the data communications system of FIG. 2 according to one embodiment.

FIG. 3 shows a process 300 for data communications system 200 of FIG. 2 according to one embodiment. Although in the described embodiments, the elements of process 300 are presented in one arrangement, other embodiments may feature other arrangements. For example, in various embodiments, some or all of the steps of process 300 can be executed in a different order, concurrently, and the like.

Referring to FIG. 3, computer 202 receives a command to identify the connected port 232 at the far end of cable 208 (step 302). In some embodiments, the command is generated by a local user. For example, the user can employ a graphical user interface of the operating system of computer 202 to generate the command.

Figure 4:
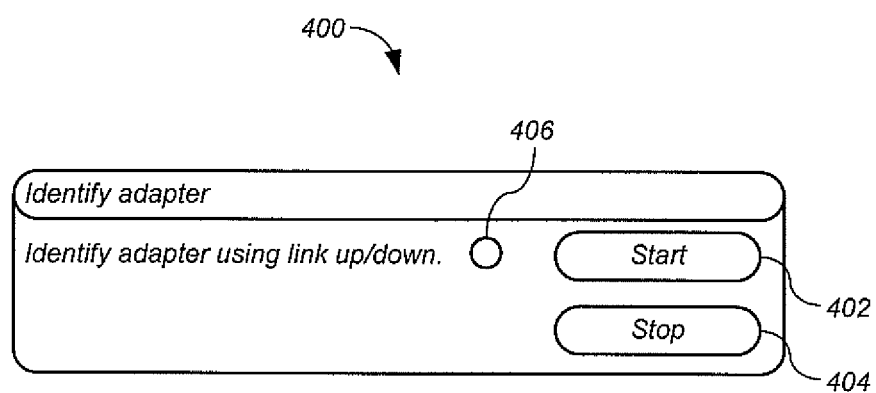
FIG. 4 shows an "Identify Adapter" window that can be used to generate a command to begin link identification according to one embodiment.

FIG. 4 shows an example "Identify Adapter" window 400 that can be used to generate the command to begin link identification according to one embodiment. Referring to FIG. 4, window 400 includes a "Start" button 402 that can be used to generate the command. Once far end port identification is complete, a "Stop" button 404 can be used to stop link identification.

In some embodiments, the command can be generated by a remote user. For example, a window similar to window 400 of FIG. 4 can be displayed to a network administrator at a remote computer.

In response to the command, computer 202 changes a state of the communication link provided by cable 208 at the near end of cable 208 according to a repeating pattern (step 304). For example, as indicated by example window 400 of FIG. 4, the state change can be making and breaking the link. This and other state changes can be employed, alone or in combination, for example by changing the link speed, the link half/full duplex status, and the like. The repeating pattern can be, for example, changing the link state every 1-3 seconds.

In some embodiments, the command indicates the repeating pattern. For example, the user can select different patterns using different link states. In other embodiments, the pattern is predetermined.

The visual or audible indicators at the "far end" and the "near end" may generate different patterns due to different hardware or software on both sides. For example, the alignment, number, or color of the LEDs 226 may be different from the LEDs 236A-N so that both sides may show different patterns.

The changes in link state are indicated by LEDs 226 of the port 222 connected to the near end of cable 208. The changes in link state are also indicated by the LEDs 236 of the port 232 of switch 206 connected to the far end of cable 208 (step 306). LEDs 236 can flash, change color, or the like. The repeating pattern should be chosen so that the changes in LEDs 236 are significantly different from normal operating patterns, and therefore easily recognizable by the human eye. For example, when the link is made and broken every 3 seconds, the ACT LED 236 of the connected port 232 of switch 206 should flash in a pattern that repeats every 3 seconds.

In some embodiments, an indication of the repeating pattern is displayed on monitor 240. For example, referring to FIG. 4, window 400 can include an indicator 406 that can show a preview of the visual pattern (such as flashing, changing color, or the like) in the manner expected at the far end of cable 208, thereby making identification of the connected far end port even easier. In other embodiments, indicator 406 can generate audible indications to preview an audible pattern.

In some embodiments, link identification ends automatically (step 308). For example, process 300 can end automatically after one minute. Ending automatically is especially useful when link identification is initiated remotely using the link being identified. Alternatively, a user can end link identification using "Stop" button 404 of FIG. 4.

Process 300 of FIG. 3 can be implemented in hardware, software, or combinations thereof. For example, software can be stored in memory 214 and or hard drive 216 of computer 202, as well as in a memory of NIC 204, and can be executed by processor 212 of computer 202, processor 228 of NIC 204, or both. As another example, hardware can be implemented in ASIC 230 of NIC 204.

Various embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. For example, the disclosed techniques can be used for any communications where a link will be established between two peers. Accordingly, other implementations are within the scope of the following claims.

What is claimed is:

1. An apparatus comprising:
a first port configured to connect to a first end of a cable to provide a communication link between (i) the first port, and (ii) a second port, wherein the second port is connected to a second end of the cable, and wherein the second port includes an indicator to indicate a state of the communication link; and
a processor in communication with the first port,
wherein the processor is configured to
during a time that (i) the first end of the cable is connected to the first port, and (ii) the second end of the cable is connected to the second port, receive a command to identify the second port to which the second end of the cable is connected, and
in response to the command, repeatedly change the state of the communication link at the first port in accordance with a pattern, and
wherein the second port, to which the second end of the cable is connected is identifiable based on the indicator of the second port indicating the pattern in which the communication link at the first port is being repeatedly changed by the processor.

2. The apparatus of claim 1, wherein the first port also includes an indicator to indicate a state of the communication link.

3. The apparatus of claim 1, wherein the state of the communication link comprises a link speed of the communication link.

4. The apparatus of claim 1, wherein the state of the communication link corresponds to whether the communication link is up or down.

5. The apparatus of claim 1, wherein the state of the communication link corresponds to whether the communication link is full duplex or half duplex.

6. The apparatus of claim 1, wherein the cable comprises a cable selected from a group consisting of: an Ethernet cable, a Universal Serial Bus (USB) cable, an IEEE 1394 firewire cable, an ISDN cable, an analog telephone cable, a digital telephone cable, and an optical cable.

7. The apparatus of claim 1, wherein the apparatus comprises a device selected from a group consisting of: a printer, a computer, a network switch, a router, and a telephone.

8. The apparatus of claim 1, wherein the apparatus comprises a network interface controller (NIC).

9. The apparatus of claim 1, wherein the indicator of the second port comprises a visual indicator.

10. The apparatus of claim 1, wherein the indicator of the second port comprises an audio indicator.

11. The apparatus of claim 1, wherein the pattern comprises a predetermined pattern.

12. An apparatus comprising:
a first port configured to connect to a first end of a cable to provide a communication link between (i) the first port, and (ii) a second port, wherein the second port is connected to a second end of the cable, and wherein the second port includes an indicator to indicate a state of the communication link; and
an application-specific integrated circuit in communication with the first port, wherein the application-specific integrated circuit is configured to
during a time that (i) the first end of the cable is connected to the first port, and (ii) the second end of the cable is connected to the second port, receive a command to identify the second port to which the second end of the cable is connected, and in response to the command, repeatedly change the state of the communication link at the first port in accordance with a pattern, and wherein the second port to which the second end of the cable is connected is identifiable based on the indicator of the second port indicating the pattern in which the communication link at the first port is being repeatedly changed by a processor.

13. A non-transitory computer readable medium having stored thereon machine executable instructions executable by a processor, where the machine executable instructions comprise:

receiving, in an apparatus having a first port connected to a first end of a cable, a command to identify a second port to which a second end of the cable is coupled, wherein the cable provides a communication link between (i) the first port, and (ii) the second port coupled to the second end of the cable; and in response to the command, repeatedly changing a state of the communication link at the first port in accordance with a pattern, wherein the second port to which the second end of the cable is coupled is identifiable based on an indicator of the second port indicating the pattern in which the communication link at the first port is being repeatedly changed.

14. The non-transitory computer readable medium of claim 13, wherein the apparatus comprises a device selected from a group consisting of: a printer, a computer, a network switch, a router, and a telephone.

15. The non-transitory computer readable medium of claim 13, wherein the apparatus comprises a network interface controller (NIC).

* * * * *